United States Patent
Zegarelli et al.

[11] Patent Number: 6,116,903
[45] Date of Patent: Sep. 12, 2000

[54] METHOD OF MASKING AND UNMASKING A DENTAL FACE MASK

[76] Inventors: Peter J. Zegarelli, 11 Raafenberg Rd., Pocantico Hills, N.Y. 10591; Mitchell Steinberg, 85 Coves Run, Oyster Bay Cove, N.Y. 11791

[21] Appl. No.: 09/406,638

[22] Filed: Sep. 27, 1999

[51] Int. Cl.[7] ....................................................... A61C 5/14
[52] U.S. Cl. ............................ 433/136; 351/111; 351/158
[58] Field of Search .................................... 433/136, 137; 351/111, 158; 128/206.13, 206.21, 206.23

[56] References Cited

U.S. PATENT DOCUMENTS

| | | | |
|---|---|---|---|
| 4,944,039 | 7/1990 | Dietrich | 2/13 |
| 5,424,787 | 6/1995 | Zegarelli | 351/111 |
| 5,813,398 | 9/1998 | Baird et al. | 128/201.17 |
| 5,956,119 | 9/1999 | Gibbs | 351/158 |

*Primary Examiner*—John J. Wilson
*Assistant Examiner*—Melba Bumgarner
*Attorney, Agent, or Firm*—Myron Amer PC

[57] ABSTRACT

For a mouth-covering dental face mask supported by elastic loops which mask during use on occasion has to be moved to a clearance or mouth-uncovered position to permit discourse between the patient and dentist, the use of eyeglasses both for supporting the elastic loops and also for conveniently masking and unmasking the dentist correlated to the taking off and putting on the eyeglasses.

1 Claim, 1 Drawing Sheet

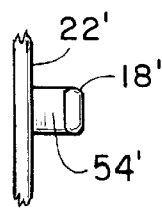 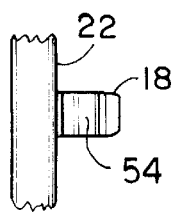 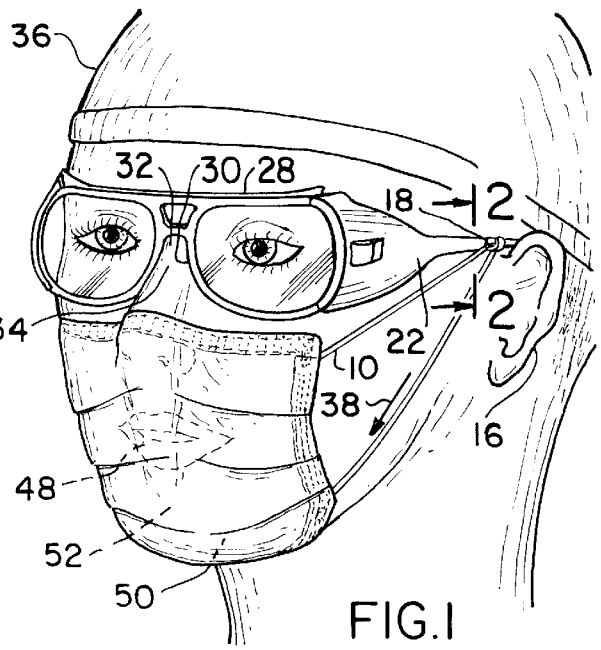
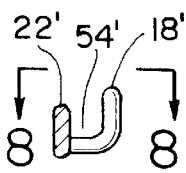 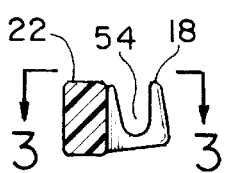
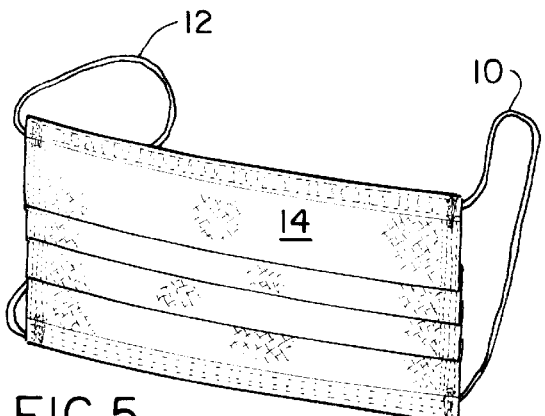 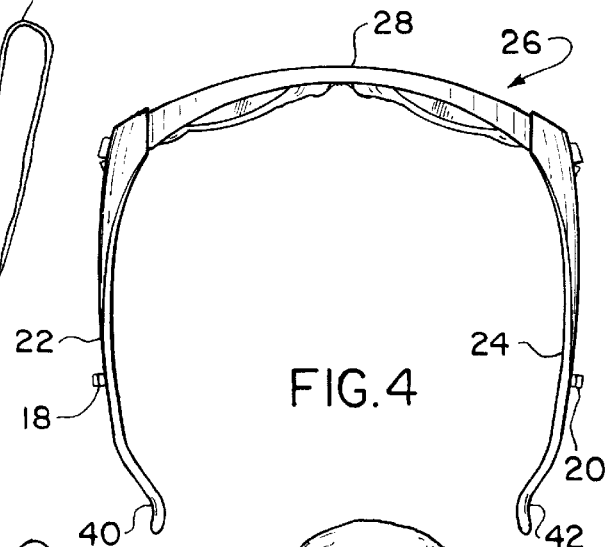
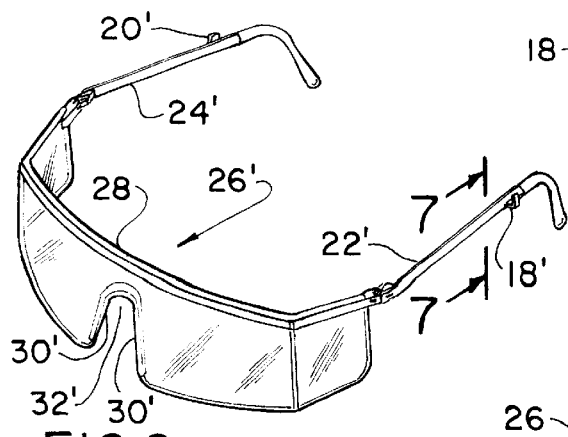 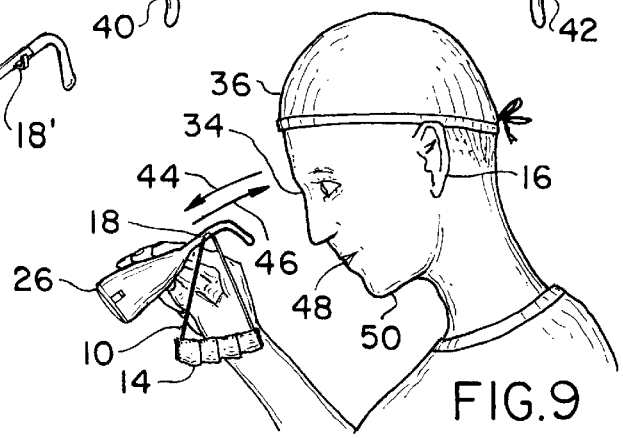

METHOD OF MASKING AND UNMASKING A DENTAL FACE MASK

The present invention relates generally to improvements in dental face mask use of a type using elastic ear loops, the improvements more particularly rendering the face mask more comfortable during its worn position over the mouth of the dentist, or other mask-user, and also contributing greater utility to the face mask for the purposes intended.

EXAMPLE OF THE PRIOR ART

The greater comfort in the use of the dentist's face mask of the method herein proposed is disclosed in U.S. Pat. No. 5,424,787 issued to co-inventor Peter J. Zegarelli for "Eyeglasses With Mask Support Attachment Means" on Jun. 13, 1995. In the '787 patent it is noted as a matter of importance that to permit conversation between the dentist and the patient, as often becomes necessary, that an earloop of the mask is detached from its site of attachment to a temple member of the eyeglasses. After the discourse with the patient, the comfort-convenience of the Zegarelli patented eyeglasses is restored by replacing the elastic earloop to its attachment site.

Although in most instances the reattaching of the elastic earloop to its cooperating attachment site is a mere ministerial chore, it could result in fumbling and even in a distraction in the dental procedure. Undoubtedly it is noted in the '787 patent because it follows the prior art practice of handling the face mask without any eyeglasses support.

Broadly, it is an object of the present invention to provide a face mask-handling method overcoming the foregoing and other shortcomings of the prior art.

More particularly, it is an object to change entirely the practice of the handling of a face mask by using to a fuller advantage its combination with an eyeglasses support, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a perspective view of a dental mask supported by a worn eyeglass frame in a masking condition and preparatory to being moved into an unmasking condition (FIG. 9);

FIG. 2 is a cross sectional view taken along line 2—2 of FIG. 1;

FIG. 3 is a plan view of FIG. 2 taken in the direction of the arrows and along line 3—3 of FIG. 2;

FIG. 4 is a plan view of a first embodiment of the eyeglass frame of FIG. 1;

FIG. 5 is a perspective view of the dental face mask of FIG. 1;

FIG. 6 is a perspective view of a second embodiment of an eyeglass frame;

FIG. 7 is a cross sectional view taken along line 7—7 of FIG. 6;

FIG. 8 is a plan view of FIG. 7 taken in the direction of the arrows and along line 8—8 of FIG. 7; and FIG. 9 is a side elevational view of a user of an eyeglass frame-supported dental mask in which arrows illustrate the practice of the masking and unmasking method according to the present invention.

It is already known according to U.S. Pat. No. 5,424,787 issued to Peter J. Zegarelli for "Eyeglasses With Mask Support Attachment Means" on Jun. 13, 1995 that the discomfort of elastic left and right earloops 10 and 12 of a conventionally constructed dental face mask 14 disposed in encircling relation about a user's respective right and left ear 16 can be obviated by attaching these loops 10 and 12 to cooperating attachment sites 18 and 20 on the temple components 22 and 24 of an eyeglass frame 26, while said eyeglass frame 26 is in its typical end use location, as depicted in FIG. 1, in which the center or front 28 of the eyeglass frame has opposing edges 30 which bound therebetween a notch 32 which in size and shape seats comfortably upon the bridge 34 of the nose of the user 36. The urgency of the elastic construction material of the loops 10 and 12 is in a direction 38 toward the dental mask 14, but the discomfort that this would ordinarily give rise to is obviated because the temple piece end ear-engaging curved configurations 40 and 42, instead of the earloops 10 and 12 per se, are in partial encircling relation about the user's right and left ear 16.

In dental procedures, it is known by common experience that discourse or conversation between a patient and the dentist 36 is often necessary and thus in the '787 patent and in addressing this problem, it is stated that the supporting of the dental mask on the eyeglass frame " . . . enable the wearer of the eyeglasses to very conveniently remove one of the mask support means [i.e., an elastic loop] from one of the attachment means on one of the eyeglass temple pieces to displace the mask from the face of the wearer to allow unrestricted conversation with a patient . . . " (Zegarelli U.S. Pat No. 5,424,787 at col. 3, line 20 to 24).

Underlying the present invention, however, is the recognition that using to a more fuller advantage the connection of the dental mask earloops 10 and 12 at the sites 18 and 20, that even the minesterial act of removing an earloop 10 or 12 is not necessary since removal of the eyeglass frame 26 with the earloops 10 and 12 still attached thereto, in the unmasking direction 44 (FIG. 9), readily permits discourse between the patient and the dentist 36.

From the unmasked condition resulting from the unmasking direction 44, the dentist 36 moving the engaged eyeglass frame 26 in a masking direction 46 will effectively restore the dental face mask 14 in covering relation over the dentist's mouth 48 to comply with sanitary code requirements. The assumption of the mouth-covering position depicted in FIG. 1 is greatly facilitated by the elasticity 38 of earloops construction material in that it does not inhibit manual positioning, as for example, of the bottom 50 of the dental mask 14 under the chin 52 of the dentist 36.

As best understood from FIG. 9, it is readily noted that in the unmasked condition depicted in FIG. 9, that the dental face mask 14 hangs in depending relation from the attachment sites 18, 20. At this time, inadvertent detachment of the earloops 10, 12 must be obviated. Thus, at each attachment site 18, 20 there is integrally connected to a cooperating temple piece 22, 24 by any appropriate means, a hook 54 in a U-shaped configuration into which a cooperating earloop 10, 12 is seated, and will stay seated during unmasking and masking directional movements 44 and 46.

For completeness sake, it is noted that different designs of eyeglass frames are suitable for use in practicing the masking and unmasking method of the present invention. A first design or embodiment is illustrated in FIGS. 1–4, inclusive, and in FIG. 9, and a second design or embodiment illustrated in FIGS. 6–8, inclusive. Features in construction and/or function in the second embodiment that have already been described in connection with the first embodiment, for brevity sake, have been designated by the same but primed reference numerals.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A method of masking and unmasking a dental face mask comprising the steps of supporting conjointly on a bridge of a nose and on the ears of a dental face mask user an eyeglass frame having a front serving as said nose support and rearwardly extending left and right side frames serving as said ear supports, using a dental face mask having a front of tissue construction material and having attached to extend rearwardly from opposite sides left and right closed loops of elastic construction material, attaching said left and right elastic closed loops of said dental face mask to said left and right side frames at locations adjacent free ends of said side frames, masking preliminarily said dental face mask by putting in place on a user said eyeglass front incident to positioning said dental mask tissue front in partial covering relation over said user's mouth, masking subsequently said dental face mask by urging in movement said dental mask tissue front to the extent permitted by the elasticity of said closed loops of elastic to a position of movement completely covering said user's mouth, and unmasking said dental face mask merely by removing said eyeglass frame from said supported position thereof, whereby the masking and unmasking is correlated to the putting on and taking off of the eyeglass frame.

* * * * *